F. C. BARTON.
DRIVING MECHANISM.
APPLICATION FILED APR. 11, 1912.
1,155,123.
Patented Sept. 28, 1915.
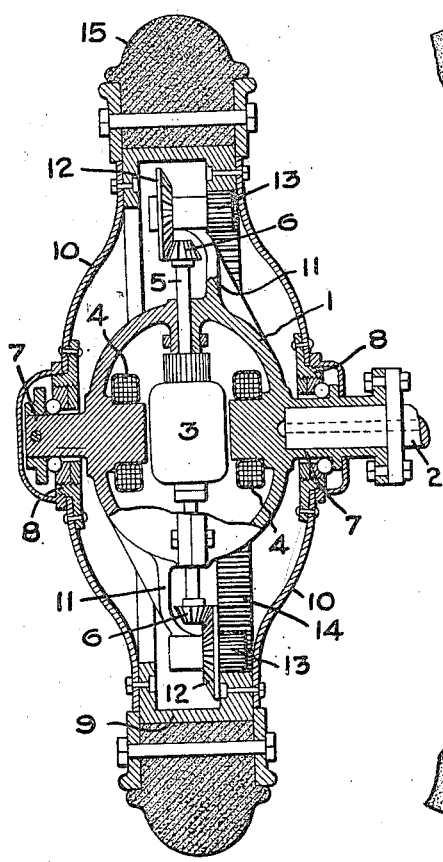
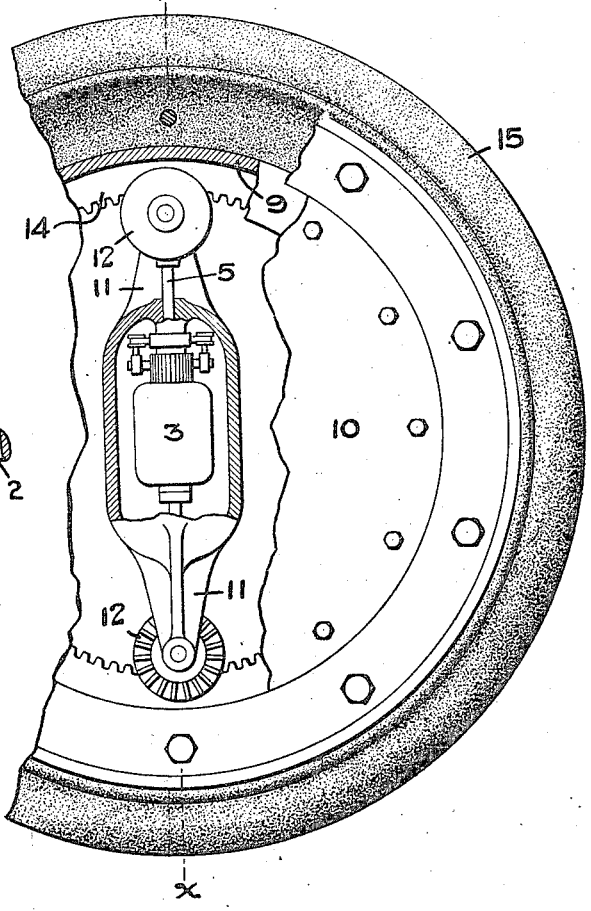
WITNESSES:
INVENTOR:
FREDERICK C. BARTON,
BY
HIS ATTORNEY.

UNITED STATES PATENT OFFICE.

FREDERICK C. BARTON, OF SCHENECTADY, NEW YORK, ASSIGNOR TO GENERAL ELECTRIC COMPANY, A CORPORATION OF NEW YORK.

DRIVING MECHANISM.

1,155,123.

Specification of Letters Patent.

Patented Sept. 28, 1915.

Application filed April 11, 1912. Serial No. 690,104.

*To all whom it may concern:*

Be it known that I, FREDERICK C. BARTON, a subject of the King of Great Britain, residing at Schenectady, county of Schenectady, State of New York, have invented certain new and useful Improvements in Driving Mechanism, of which the following is a specification.

My invention relates to improvements in driving mechanism, and refers more specifically to driving mechanism for transmitting rotary motion.

The invention is particularly adapted to be employed in connection with a tractor wheel geared directly to a motor, the motor and wheel having a single mounting, although it is evident that this is only one of many applications of the invention.

The objects of my invention are to improve and simplify the construction of such mechanism, and also to reduce the minimum speed at which the driven element, as for example, the tractor wheel, may be efficiently rotated.
My invention consists in connecting a circular rack which is rigidly fixed to the tractor wheel to the driving motor by a combination of gearing in such a manner that a very material reduction in the efficient minimum speed of the tractor wheel is effected, and, furthermore, the mechanism is simplified and improved by employing only one circular rack, simultaneously driven at two diametrically opposite points.
For a further understanding of my invention, reference is to be had to the accompanying drawings, in which—

Figure 1 is a sectional end elevation taken on the line $x$—$x$ of Fig. 2, and showing a tractor wheel embodying the novel features of my invention, and Fig. 2 is a front elevation of such a wheel, a part being broken away, and a part shown in section.

In the drawings, I have shown an electric motor having a frame 1, a revolving armature 3 and field coils 4. The armature 3 is mounted on a shaft 5 which is continuous and extends in both directions beyond the frame of the motor and is provided at each of its ends with a gear 6. The motor is arranged to drive a rotatable rim 9, provided with a circular rack 14 having a single series of teeth which are shown on the inner side of the rim, through two similar sets of gears at opposite sides of the rack. These sets of gears preferably comprise stub shafts having mounted thereon pinions 13 which engage with the circular rack 14 and gears 12 which mesh with the gears 6. The gears 6 and 12 are preferably bevel gears the bevel gears 12 being faced oppositely. The armature shaft 5 extends in a direction parallel to the plane of the rim and is shorter than the internal diameter of the rack 14.

The frame 1 of the motor is shown as being rigidly secured to an axle 2 and is provided with extensions 7 which form bearings for the hub 8 of a wheel. The wheel comprises the rim 9 secured to the hub by circular plates 10, which latter may serve also to inclose the working parts of the driving mechanism. A tire 15 may be secured, if desired, to the outer surface of the rim in any well known manner.

Supporting brackets 11, preferably made integral with the frame 1 of the motor, provide at their ends supports for the stub shafts. Preferably the upper gears 12 and 13, shown in Fig. 2, are rigidly secured to their shaft, while the lower gears 12 and 13 are rigidly fixed to one another and are loosely mounted on their shaft.

The operation of my device is as follows: The rotation of the armature 3 will transmit to the pinions 13 through the shaft 5, the gears 6 and the gears 12 an effective driving force in the same direction, and thus these pinions will drive the rack 14 and accordingly the wheel. It will thus be seen that I transmit the motion of the motor to the wheel by a combination of bevel and spur gearing which results in a reduction in the efficient minimum speed at which the wheel may be driven. By employing this combination of bevel and spur gear drive, I also simplify the mechanism heretofore used, since I am thereby enabled to simultaneously drive a single circular rack at two points.

Although I have illustrated my invention in connection with a tractor wheel, it is obvious that the same is in no sense limited to this particular application. I do not wish, therefore, to be limited to the details of construction shown and described herein, except to the extent that the same are made the subject of specific claims.

What I claim as new and desire to secure by Letters Patent of the United States, is:

1. The combination with a circular rack having a single series of teeth, of a continuous shaft, said shaft being shorter than the internal diameter of said rack, a motor for driving said shaft near its center, and similar gearing at each end of said shaft and in operative relation therewith for simultaneously driving said series of teeth.

2. A rotatable rim, a circular rack secured to the rim, said rack having a single series of teeth, a motor having a continuous shaft extending parallel to the plane of said rim, said shaft being shorter than the internal diameter of said rack, and similar gearing at both ends of said shaft for simultaneously transmitting motion from said motor to opposite points of said series of teeth.

3. A rotatable rim having a rack on its inner surface, said rack having a single series of teeth, a motor, a continuous shaft parallel to the plane of said rim adapted to be driven by said motor and being shorter than the internal diameter of said rack, and similar gearing operatively connecting each end of the shaft with said series of teeth.

4. In a wheel drive for tractors, a wheel, a circular rack rigidly secured to said wheel, said rack having a single series of teeth, a motor having a continuous shaft extending parallel to the plane of said wheel, said shaft being shorter than the internal diameter of said rack, and similar gearing for driving said wheel by said motor at two diametrically opposite points of said series of teeth.

5. A rotatable rim, a circular rack secured to the rim, said rack having a single series of teeth, a continuous shaft extending parallel to the plane of said rim and being shorter than the internal diameter of said rack, a motor for driving said shaft near its center, similar beveled gearing in operative relation with each end of said shaft, and pinions meshing with said rack at approximately opposite points and each operatively connected to one of said beveled gearings.

6. A rotatable rim, a circular rack secured to the rim, stub shafts at opposite sides of the rack, a gear on each of said stub shafts engaging said rack, another gear on each of said stub shafts, a continuous shaft extending parallel to the plane of the rim and being shorter than the internal diameter of said rack, said last mentioned shaft having gears at each end thereof meshing with said last mentioned gears at opposite sides of said continuous shaft, and a motor for driving said shaft near its center.

7. A rotatable rim, a circular rack secured to the rim, a continuous shaft extending parallel to the plane of the rim and being shorter than the internal diameter of said rack, a motor for driving said shaft near its center, beveled gears at each end of said shaft, stub shafts at opposite sides of said rack, oppositely facing beveled gears mounted upon said stub shafts, one of said last mentioned beveled gears meshing with one of said first mentioned beveled gears on one side of said continuous shaft, the other of said last mentioned beveled gears meshing with the other of said first mentioned beveled gears on the other side of said continuous shaft, and pinions on said stub shafts meshing with said rack.

8. A rotatable rim having a circular rack, a rotatable shaft extending parallel to the plane of said rim, a bevel gear secured to one end of said shaft, a motor for driving said shaft, a stub shaft, a bracket secured to the frame of said motor and forming a support for said stub shaft, a bevel gear mounted on said stub shaft and meshing with said first mentioned bevel gear, and a pinion mounted on said stub shaft and operatively connected to said last mentioned bevel gear and meshing with said rack.

9. A wheel, a motor, extensions on the frame of said motor forming bearings for said wheel, a rotatable shaft driven near its central portion by said motor, bevel gears secured to each end of the shaft, two stub shafts, brackets on the motor frame forming supports for said stub shafts, bevel gears meshing with said first mentioned bevel gears and mounted on each stub shaft, a pinion mounted on each stub shaft and operatively connected to said last mentioned bevel gears, and a circular rack secured to said wheel and in operative relation with said pinions.

10. A vehicle wheel, a circular rack secured thereto, pinions meshing with said rack, a motor provided with a shaft extending from both sides of the rotor of the motor and being shorter than the internal diameter of said rack, a single mounting whereby the wheel and motor are held in fixed relation to each other, and similar speed reducing gearing at each end of said shaft and operatively connected to said pinion meshing with said rack.

In witness whereof, I have hereunto set my hand this 9th day of April, 1912.

FREDERICK C. BARTON.

Witnesses:
BENJAMIN B. HULL,
HELEN ORFORD.